USO05668840A

United States Patent [19]
Takano

[11] Patent Number: 5,668,840
[45] Date of Patent: Sep. 16, 1997

[54] SYNCHRONIZING CIRCUIT FOR USE IN A DIGITAL AUDIO SIGNAL COMPRESSING/EXPANDING SYSTEM

[75] Inventor: Hideto Takano, Tokyo, Japan

[73] Assignee: NEC Corporation, Japan

[21] Appl. No.: 625,915

[22] Filed: Apr. 1, 1996

[30] Foreign Application Priority Data

Mar. 30, 1995 [JP] Japan .................................. 7-072805

[51] Int. Cl.⁶ ................................................ H04L 7/00
[52] U.S. Cl. ................................ 375/368; 375/357
[58] Field of Search ........................... 370/105.1, 514, 370/324; 375/368, 357

[56] References Cited

U.S. PATENT DOCUMENTS

| | | | |
|---|---|---|---|
| 4,002,845 | 1/1977 | Kaul et al. | 370/105.1 |
| 5,140,618 | 8/1992 | Kinoshita et al. | 375/368 |
| 5,161,171 | 11/1992 | Suzuki et al. | 375/368 |
| 5,303,270 | 4/1994 | Fujii | 375/368 |
| 5,313,500 | 5/1994 | Rikiyama | 370/105.1 |

OTHER PUBLICATIONS

Maturi; "Single Chip MPEG Audio Decoder"; Aug. 1992; pp. 348–356; IEEE Transactions on Consumer Electronics No. 3 vol. 38.

Primary Examiner—Stephen Chin
Assistant Examiner—Joseph Roundtree
Attorney, Agent, or Firm—Hayes, Soloway, Hennessey, Grossman & Hage, P.C.

[57] ABSTRACT

In a synchronizing circuit receiving a bit stream including a synchronous pattern and various kinds of information bits, for outputting a synchronous signal, there is provided a synchronous pattern register which is previously set with known information bits of the layer, the bit rate and the sampling frequency. A synchronous pattern detecting circuit is configured not to recognize as a synchronous pattern, a synchronous pattern having the values other than previously set values. With this arrangement, it is possible to remarkably reduce probability that a quasi synchronous pattern is detected as the synchronous pattern, and therefore, it is possible to minimize missing of sound corresponding to the digital audio signal.

2 Claims, 6 Drawing Sheets

FIGURE 2 PRIOR ART

| BIT RATE INDEX | BIT RATE (kbit/s) | | |
|---|---|---|---|
| | LAYER 1 | LAYER 2 | LAYER 3 |
| 0 0 0 0 | free | free | free |
| 0 0 0 1 | 32 | 32 | 32 |
| 0 0 1 0 | 64 | 48 | 40 |
| 0 0 1 1 | 96 | 56 | 48 |
| 0 1 0 0 | 128 | 64 | 56 |
| 0 1 0 1 | 160 | 80 | 64 |
| 0 1 1 0 | 192 | 96 | 80 |
| 0 1 1 1 | 224 | 112 | 96 |
| 1 0 0 0 | 256 | 128 | 112 |
| 1 0 0 1 | 288 | 160 | 128 |
| 1 0 1 0 | 320 | 192 | 160 |
| 1 0 1 1 | 352 | 224 | 192 |
| 1 1 0 0 | 384 | 256 | 224 |
| 1 1 0 1 | 416 | 320 | 256 |
| 1 1 1 0 | 448 | 384 | 320 |
| 1 1 1 1 | INHIBIT | INHIBIT | INHIBIT |

SYNCHRONIZING CIRCUIT FOR USE IN A DIGITAL AUDIO SIGNAL COMPRESSING/EXPANDING SYSTEM

BACKGROUND OF THE INVENTION

1. Field of the Invention

The present invention relates to a synchronizing circuit, and more specifically to a synchronizing circuit for a bit stream in a digital audio signal compressing/expanding system.

2. Description of Related Art

In the prior art, one example of this type synchronizing circuit includes a synchronizing circuit for a bit stream in a compressing/expanding system for a digital audio signal standardized accordance with ISO/IEC 11172-3 (called a "MPEG/Audio system" hereinafter). This MPEG/Audio system includes three systems, namely, Layer 1 system, Layer 2 system and Layer 3 system. In the following, the prior art based on the Layer 2 system will be described.

However, before describing the prior art, a summary of the MPEG/Audio system will be described.

The number of bits included in one frame of the MPEG/Audio Layer 2 system is determined in accordance with the following equation from a bit rate and a sampling frequency:

{number of bits included in one frame}={bit rate}×1152÷{sampling frequency }

In addition, it is defined that number of bits included in one frame is a multiple of "8". For example, if the bit rate is 192 kb/s and the sampling frequency is 48 KHz, the number of bits included in one frame is 4608 (bits).

One frame of the MPEG/Audio Layer 2 system under the above mentioned conditions has the structure as shown in FIG. 1, which includes a header, a CRC (Cyclic Redundancy Check) code, a bit allocation index, a scale factor selection information, a scale factor index, a sample and an ancillary data. The header is constituted of a synchronous pattern formed of continuous 12 bits of "1", and various information formed of 20 bits. These 20 bits include information used for determining the bit number of one frame, for example, a bit rate index, a layer, a sampling frequency, and padding. A first bit of various kinds of information included in these 20 bits is called an "ID bit"b , which is defined as "1" in the MPEG/Audio Layer 2 system.

In addition, the bit rate index is expressed by 4 bits. On the basis of the value of the bit rate index and the value of the layer, the bit rate is defined as shown in the table of FIG. 2. However, use of "1111" is inhibited. The layer is expressed by 2 bits. "11" indicates layer 1, and "10" indicates layer 2. "01" designates layer 3. However, "00" is undefined. The sampling frequency is expressed by 2 bits. "00" designates 44.1 KHz, and "01" indicates 48 KHz. "10" designates 32 KHz. However, "11" is undefined. If the padding is "1", the bit number of one frame is increased by one slot, and if the padding is "0", the bit number of one frame is unchanged. It is defined that the bit number of one slot is 32 bits in the case of layer 1 and 8 bits in the cases of layer 2 and layer 3.

The above mentioned synchronous pattern does not exist uniquely in each frame, but there is the possibility that the same pattern as the synchronous pattern is included in a portion other than the header. Because of this, it is not possible to conclude immediately from the detection of the synchronous pattern that synchronism has been established.

If an audio signal is decoded on the basis of a false or quasi synchronous pattern, a noise sound is generated. As a countermeasure for solving this problem, the synchronous circuit is configured to judge that the synchronism has been established, after a first synchronous pattern is detected, a normal synchronous pattern exists at a position after one frame. Furthermore, if it can be judged that a synchronous pattern exists in each of three or more continuous frames, it is possible to more precisely detect the synchronous pattern.

As seen from the above, it is not so easy to detect the synchronous pattern included in a bit stream. In the prior art, a specially designed synchronizing circuit as shown in FIG. 3 has been used.

As shown in FIG. 3, the prior art synchronizing circuit includes a serial parallel converter 2, a header register 3, a synchronous pattern detector 4, a controller 5, a frame counter 6, a frame length generator 7, a comparator 8, and an inconsistency detector 9, which are coupled as shown.

Now, operation of the prior art synchronizing circuit will be described. First, a reset signal 102 is applied to the controller 5, so that the controller 5 is initialized in response to the reset signal 102, and outputs a counter reset signal 111 to the frame counter 6 and starts to output a read clock 103 to the serial parallel converter 2. On the other hand, a stream of bits 101 are supplied to the serial parallel converter 2, and a bit in the bit stream is received by the serial parallel converter 2 in response to a rising of the read clock 103, so that the bit stream 101 is converted in accordance with the read clock 103 into a parallel value of 32 bits which are the same in number as the bit number of the header. The parallel value of 32 bits is outputted as data 107 to the synchronous pattern detector 4 and the header register 3. The data 107 has such a format that the most significant bit is the oldest in time.

The synchronous pattern detector 4 generates a synchronous pattern detection signal 108 when the received data 107 is consistent with the synchronous pattern, and the synchronous pattern detection signal 108 is supplied to the controller 5 and the consistency detector 9.

Here, the synchronous pattern detector 4 is constituted of a combinational circuit configured to generate the synchronous pattern detection signal 108 only when all of the following conditions are satisfied. In the following synchronous pattern detection conditions, the most significant bit of the 32-bit parallel value of the data 107 is indicated by "31" and the least significant bit is expressed by "0". For example, the value expressed by 12 bits counted from the most significant bit is expressed as "31:20".

Synchronous Pattern Detection Conditions

Synchronous pattern "31:20"=all "1"

ID "19"="1"

Layer "18:17"=other than "00"

Bit rate index "15:12"=other than "1111"

Sampling frequency "11:10"=other than "11"

After the controller 5 is initialized, if a first synchronous pattern detection signal 108 is generated, the controller 5 outputs a latch signal 109 to the header register 3 so as to cause it to latch the information determining the frame length, extracted from the data 107 which is outputted from the serial parallel converter 2. The latched information is outputted from the header register 3 as header information 110 to the frame length generator 7.

This frame length generator 7 seeks the bit number of one frame on the basis of the header information 110, and outputs it as frame length data 112 to the comparator 8. On the other hand, the frame counter 6 is reset by the counter reset signal 111 outputted from the controller 5, and counts the read clock 103 supplied from the controller 5 so that a count value 113 of the frame counter 5 is supplied to the comparator 8. Here, the counter reset signal 111 is being generated without discontinuance until the synchronous pattern detection signal 108 is supplied to the controller 5, and therefore, the frame counter 6 does not carry out the counting operation at all during a period in which the counter reset signal 111 continues to be supplied.

The comparator 8 generates a count end signal 114 when the frame length data 112 and the count value 113 are consistent with each other, and the count end signal 114 is supplied to the consistency detector 9. If the synchronous pattern detection signal 108 is supplied from the synchronous pattern detector 4 to the consistency detector 9 at the same time as the count end signal 114 is supplied to the consistency detector 9, the consistency detector 9 judges that synchronism has been established, and outputs a synchronous signal 116, which is supplied not only to an external device but also to the controller 5. If the synchronous signal 116 indicating that synchronism has been established, is supplied from the consistency detector 9 to the controller 5, the controller 5 stops outputting the read clock 103.

If the synchronous pattern detection signal 108 is not generated at the same time as the count end signal 114 is generated, it is judged that synchronism has not yet been established, and the consistency detector 9 outputs an inconsistency signal 115, which is supplied to the controller 5. A first synchronous pattern in this case will be called a "quasi synchronous pattern" in the following. In this case, namely, when the inconsistency signal 115 is applied to the controller 5, the circuit is caused to return to the initial condition, so that in response to the inconsistency signal 115, the bit stream 101 of the amount supplied until that time and corresponding to one frame is disposed. Namely, the bits of the number corresponding to the frame length data 112 outputted from the frame length generator 7 are disposed. Here, it is to be noted that the number of bits disposed at this time is the bit number value obtained by construing as the header the 32 bits starting from the quasi synchronous pattern, which, is different from an actual frame length. Therefore, the timing for establishing frame synchronism has to be delayed.

Referring to FIG. 4, there is shown a timing chart illustrating the timing for establishing frame synchronism, when a counting operation starts from a normal synchronous pattern. FIG. 5 shows a timing chart illustrating the timing for establishing the frame synchronism, when a counting operation starts from a quasi synchronous pattern. "A" in FIGS. 4 and 5 indicates the bit stream 101, and "B" in FIGS. 4 and 5 shows the synchronous pattern detection signal 108. "C" in FIGS. 4 and 5 indicates the synchronous signal 116. The hatched portion in "A" of FIGS. 4 and 5 designates the synchronous pattern.

In "A" of FIG. 4, if it is constructed that the frame included in the bit stream 101 is the layer 2, the sampling frequency is 48 KHz, and the bit rate is 192 kb/s, the bit number of one frame is 4608 bits. In "A" of FIG. 5, if it is constructed that the frame included in the bit stream 101 is the layer 2, the sampling frequency is 48 KHz, and the bit rate is 256 kb/s, when the inconsistency signal 115 is generated in the consistency detector 9, the number of bits disposed is 6144 bits.

Additionally, in the example shown in FIG. 4, at the moment a second normal synchronous pattern is inputted, the synchronous signal 116 is generated and outputted. However, in the example shown in FIG. 5, since the quasi synchronous pattern exists at a heading, two normal synchronous patterns just after the quasi synchronous pattern are missed in reading, and the synchronous signal 116 is firstly generated at the moment a fourth normal synchronous pattern is inputted. Namely, because the quasi synchronous pattern is detected, the two normal frames are disposed extra. In certain cases, the number of normal synchronous patterns disposed further increases, dependently upon mutual relation between the number of the normal frames and the bit number of a frame based on the quasi synchronous pattern.

As mentioned above, since the frames in a heading portion are disposed, a heading portion is missing in a sound corresponding to a digital audio signal.

Furthermore, if the disposal of the bit stream based on the quasi synchronous pattern is repeatedly performed until the synchronous signal is generated, the period of the missing in the sound corresponding to the digital audio signal becomes long.

SUMMARY OF THE INVENTION

Accordingly, it is an object of the present invention to provide a synchronizing circuit, which overcomes the above mentioned defects of the conventional one.

Another object of the present invention is to provide a synchronizing circuit, capable of minimizing missing of sound corresponding to the digital audio signal.

The above and other objects of the present invention are achieved in accordance with the present invention by a synchronizing circuit receiving a bit stream including a synchronous pattern and various kinds of information bits, for outputting a synchronous signal, the circuit comprising a synchronous pattern register which is previously set with known information bits of the various kinds of information bits, and means for generating the synchronous signal when there is inputted the bit stream which is consistent with not only the synchronous pattern and the known information bits set in the synchronous pattern register.

More specifically, there is provided a synchronizing circuit configured to receive a bit stream including a synchronous pattern and a frame length determining information in each one frame, and to detect a frame boundary so as to generate a frame synchronous signal corresponding to the synchronous pattern, the synchronizing circuit comprising:

a synchronous pattern holding means for holding, as a synchronous pattern value, an expected value corresponding to at least a portion of the frame length determining information;

a data converting means receiving the bit stream for serial-parallel converting the received bit stream into parallel data;

a synchronous pattern detecting means receiving from the parallel data a partial bit train corresponding to the synchronous pattern and the synchronous pattern value, for generating a synchronous pattern detection signal when the partial bit train is consistent with the synchronous pattern and when a portion of the partial bit train corresponding to the synchronous pattern value is consistent with the synchronous pattern value; and a synchronous pattern discriminating means receiving the synchronous pattern detection signal, for generating a predetermined synchronous signal.

In one embodiment, the synchronous pattern holding means includes a synchronous pattern register for holding the synchronous pattern value. The synchronous pattern detecting means includes:

a header register responding to the synchronous pattern detection signal to extract and hold the frame length determining information from the parallel data;

a frame counter responding to the synchronous pattern detection signal to count the number of bits included in the bit stream supplied after the synchronous pattern detection signal;

a frame length generator for outputting the bit number of one frame from a value held in the header register;

a comparator comparing a count value of the frame counter with the bit number of one frame outputted from the frame length generator, and for generating a count end signal when both are consistent with each other; and a consistency detector for generating the predetermined synchronous signal when the synchronous pattern detection signal and the count end signal are concurrently generated.

The above and other objects, features and advantages of the present invention will be apparent from the following description of preferred embodiments of the invention with reference to the accompanying drawings.

BRIEF DESCRIPTION OF THE DRAWINGS

FIG. 2 is a table illustrating the bit rates determined by the bit rate index and the layer value;

DESCRIPTION OF THE PREFERRED EMBODIMENTS

Figure 1:
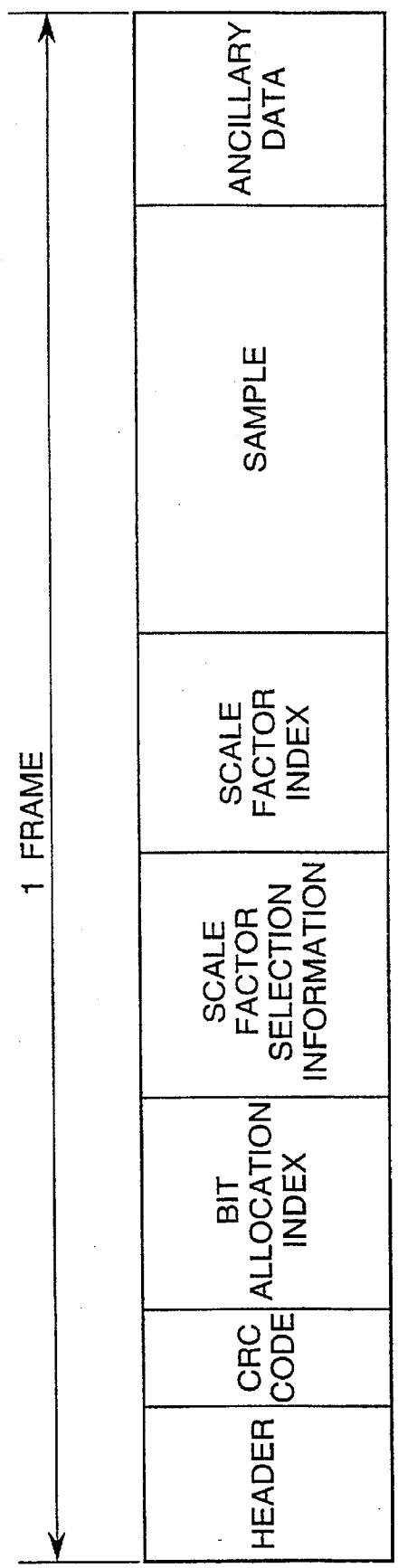
FIG. 1 illustrates the structure of one frame of the MPEG/Audio Layer 2 system.
Figure 3:
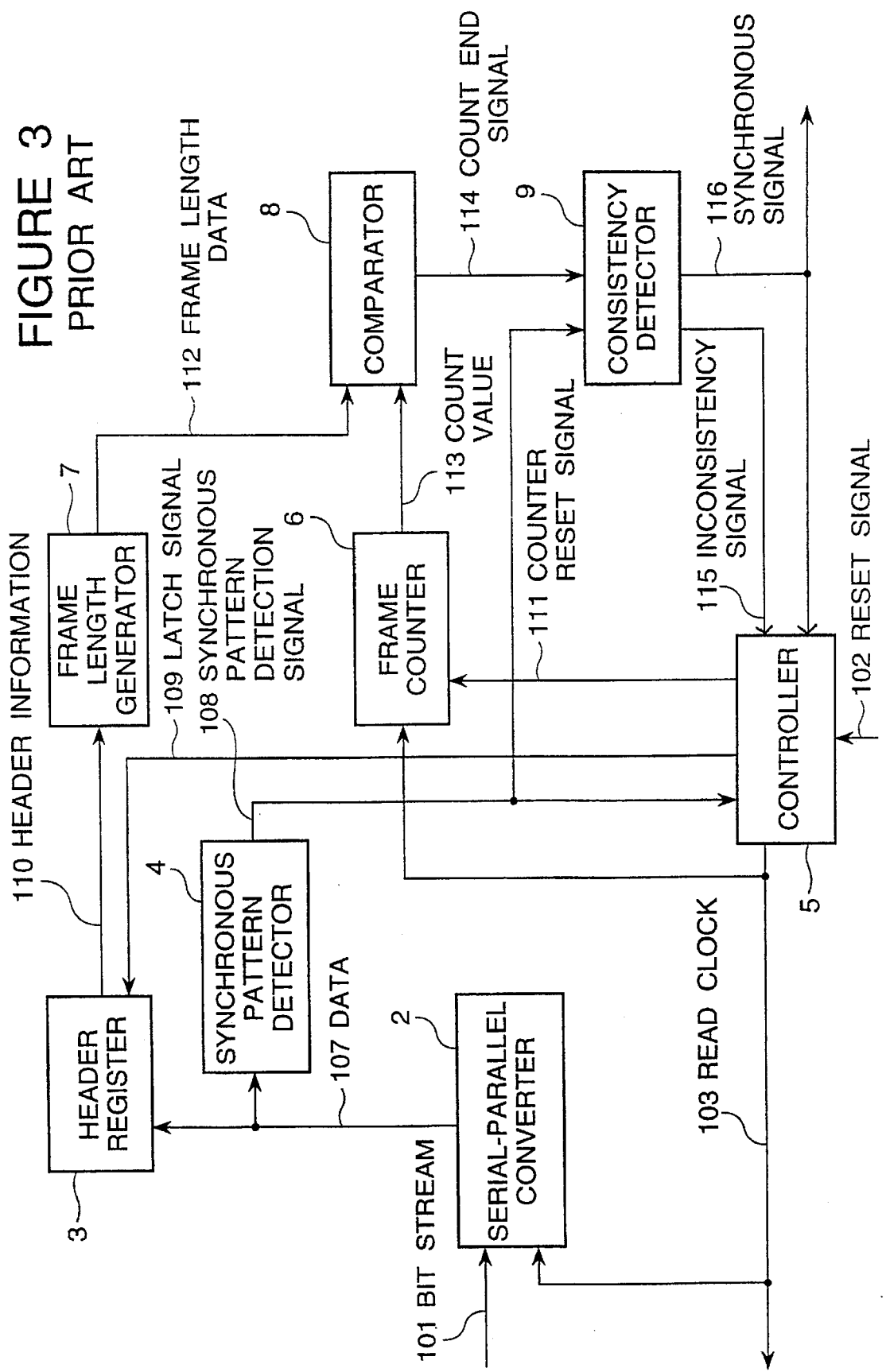
FIG. 3 is a block diagram of the specially designed synchronizing circuit in the prior art.
Figure 6:
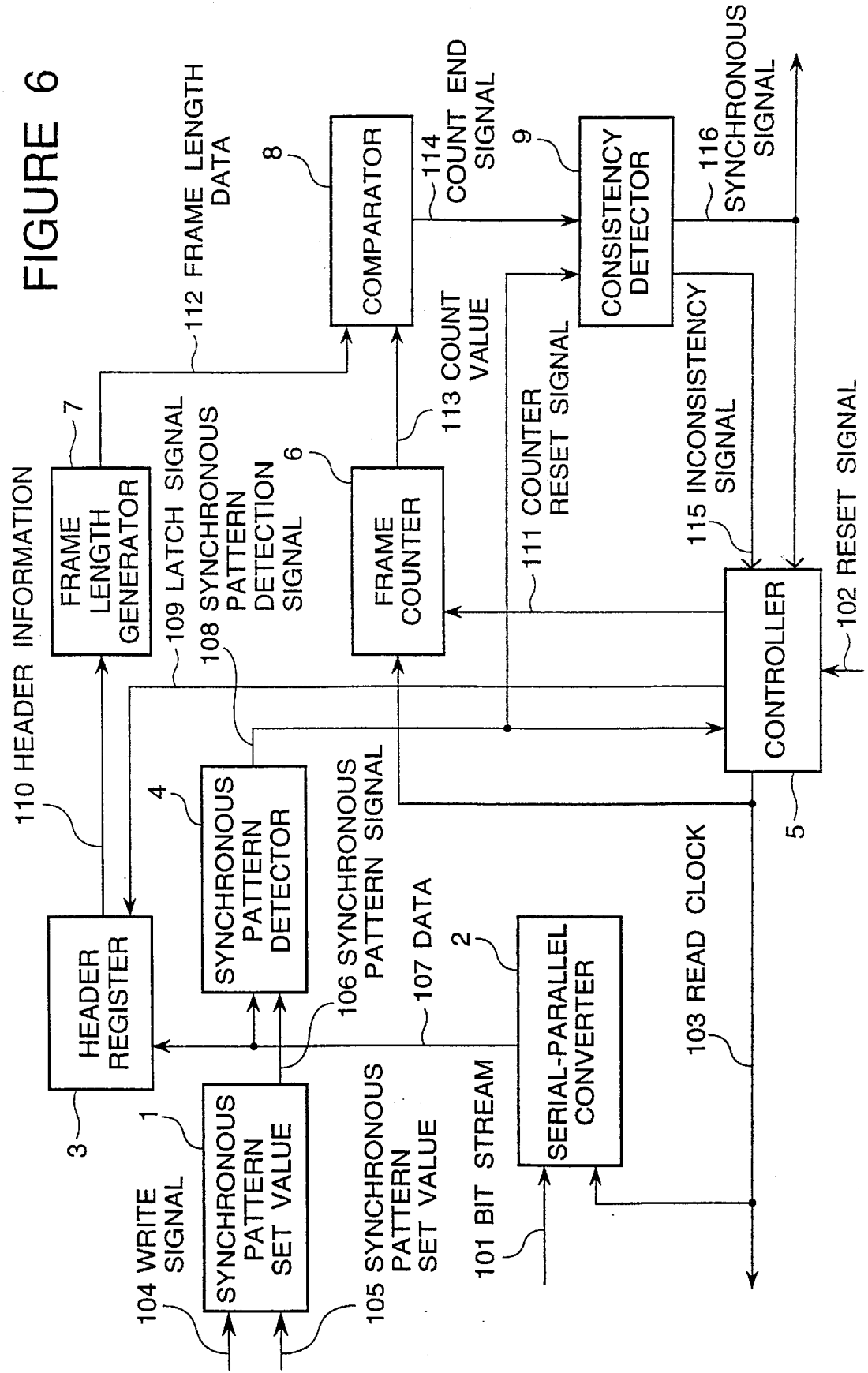
FIG. 6 is a block diagram of an embodiment of the synchronizing circuit in accordance with the present invention.

Referring to FIG. 6, there is shown block diagram of an embodiment of the synchronizing circuit in accordance with the present invention. In FIG. 6, elements similar to those shown in FIG. 3 are given the same Reference Numeral. This embodiment is constructed as a specially designed synchronizing circuit.

As shown in FIG. 6, the embodiment of the synchronizing circuit includes a synchronous pattern register 1, a serial parallel converter 2, a header register 3, a synchronous pattern detector 4, a controller 5, a frame counter 6, a frame length generator 7, a comparator 8, and an inconsistency detector 9, which are coupled as shown.

As seen from comparison between FIGS. 3 and 6, the shown embodiment is different from the prior art example in that, the shown embodiment newly adds the synchronous pattern register 1 receiving a write signal 104 and a synchronous pattern setting value 105 and for outputting a synchronous pattern value 106 to the synchronous pattern detector 4.

Now, operation of the embodiment of the synchronizing circuit will be described. First, a reset signal 102 is applied to the controller 5, so that the controller 5 is initialized in response to the reset signal 102, and outputs a counter reset signal 111 to the frame counter 6 and starts to output a read clock 103 to the serial parallel converter 2. On the other hand, a stream of bits 101 is supplied to the serial parallel converter 2, and a bit in the bit stream is received by the serial parallel converter 2 in synchronism with to a rising of the mad clock 103, so that the bit stream 101 is converted in accordance with the read clock 103 into a parallel value of 32 bits which are the same in number as the bit number of the header. The parallel value of 32 bits is outputted as data 107 to the synchronous pattern detector 4 and the header register 3. The data 107 has such a format that the most significant bit is the oldest in time.

On the other hand, as mentioned above, the write signal 104 and the synchronous pattern setting value 105 are supplied to the synchronous pattern register 1, so that the synchronous pattern setting value 105 is held in the synchronous pattern register 1 in response to the write signal 104, and then, outputted as the synchronous pattern value 106 to the synchronous pattern detector 4.

The synchronous pattern detector 4 generates a synchronous pattern detection signal 108 when the received data 107 is consistent with the synchronous pattern and also consistent with items designated by the synchronous pattern value 106. The synchronous pattern detection signal 108 is supplied to the controller 5 and the consistency detector 9.

After the controller 5 is initialized, if a first synchronous pattern detection signal 108 is generated, the controller 5 outputs a latch signal 109 to the header register 3 so as to cause it to latch the frame length determining information, extracted from the data 107 which is outputted from the serial parallel converter 2. The latched information is outputted from the header register 3 as header information 110 to the frame length generator 7.

This frame length generator 7 seeks the bit number of one frame on the basis of the header information 110, and outputs it as frame length data 112 to the comparator 8. On the other hand, the frame counter 6 is reset by the counter reset signal 111 outputted from the controller 5, and counts the read clock 103 supplied from the controller 5 so that a count value 113 of the frame counter 6 is supplied to the comparator 8. Here, the counter reset signal 111 is being generated without discontinuance until the synchronous pattern detection signal 108 is supplied to the controller 5, and therefore, the frame counter 6 does not carry out the counting operation at all during a period in which the counter reset signal 111 continues to be supplied.

The comparator 8 receives the frame length data 112 and the count value 113, and generates a count end signal 114 when the frame length data 112 and the count value 113 are consistent with each other, and the count end signal 114 is supplied to the consistency detector 9. If the synchronous pattern detection signal 108 is supplied from the synchronous pattern detector 4 to the consistency detector 9 at the same time as the count end signal 114 is supplied to the consistency detector 9, the consistency detector 9 judges that synchronism has been established, and outputs a synchronous signal 116, which is supplied not only to an external device but also to the controller 5. If the synchronous signal 116 indicating that synchronism has been established, is supplied from the consistency detector 9 to the controller 5, the controller 5 stops outputting the read clock 103.

If the synchronous pattern detection signal 108 is generated at the same time as the count end signal 114 is generated, it is not judged that synchronism has not yet been established, and the consistency detector 9 outputs an inconsistency signal 115 to the controller 5.

Here, it can be so constructed that, if the synchronous pattern detection signal 108 is generated at the stone time as the count end signal 114 is generated, continuously over three or more frames, the synchronous signal 116 is generated.

When the inconsistency signal 115 is applied to the controller 5, the controller 5 is caused to return to the initial condition, so that in response to the inconsistency signal 115, the bit stream 101 of the amount supplied until that time and corresponding to one frame is disposed. Namely, the bits of the number corresponding to the frame length data 112 outputted from the frame length generator 7 are disposed.

Here, one example of the value set in the synchronous pattern register 1 will be explained with reference to the following system: In this system, it is assumed that it is judged as the synchronous pattern only when the set value of the bit rate index is consistent with the bit rate index value included in the header, the set value of the sampling frequency is consistent with the sampling frequency included in the header, and the set value of the layer frequency is consistent with the layer included in the header. In this system, the synchronous pattern detector 4 is constituted by a logic circuit configured to generate the synchronous pattern detection signal 108 only when all of the following conditions (1) and (2) are satisfied. In the following synchronous pattern detection conditions, the most significant bit of the 32-bit parallel value of the data 107 is indicated by "31" and the least significant bit is expressed by "0". For example, the value expressed by 12 bits counted from the most significant bit is expressed as "31:20".

Synchronous Pattern Detection Condition (1)
Synchronous pattern "31: 20"=all "1"
ID "19"="1"
Layer "18:17"=other than "00"
Bit rate index "15:12"=other than "1111"
Sampling frequency "11:10"=other than "11"
Synchronous Pattern Detection Condition (2)
Layer "18:17"=Layer set value of Synchronous pattern setting value 104
Bit rate index "15:12"=Bit rate index set value of Synchronous pattern register setting value 104
Sampling frequency "11:10"=Sampling frequency set value of Synchronous pattern setting value 104

Figures 4, 5:
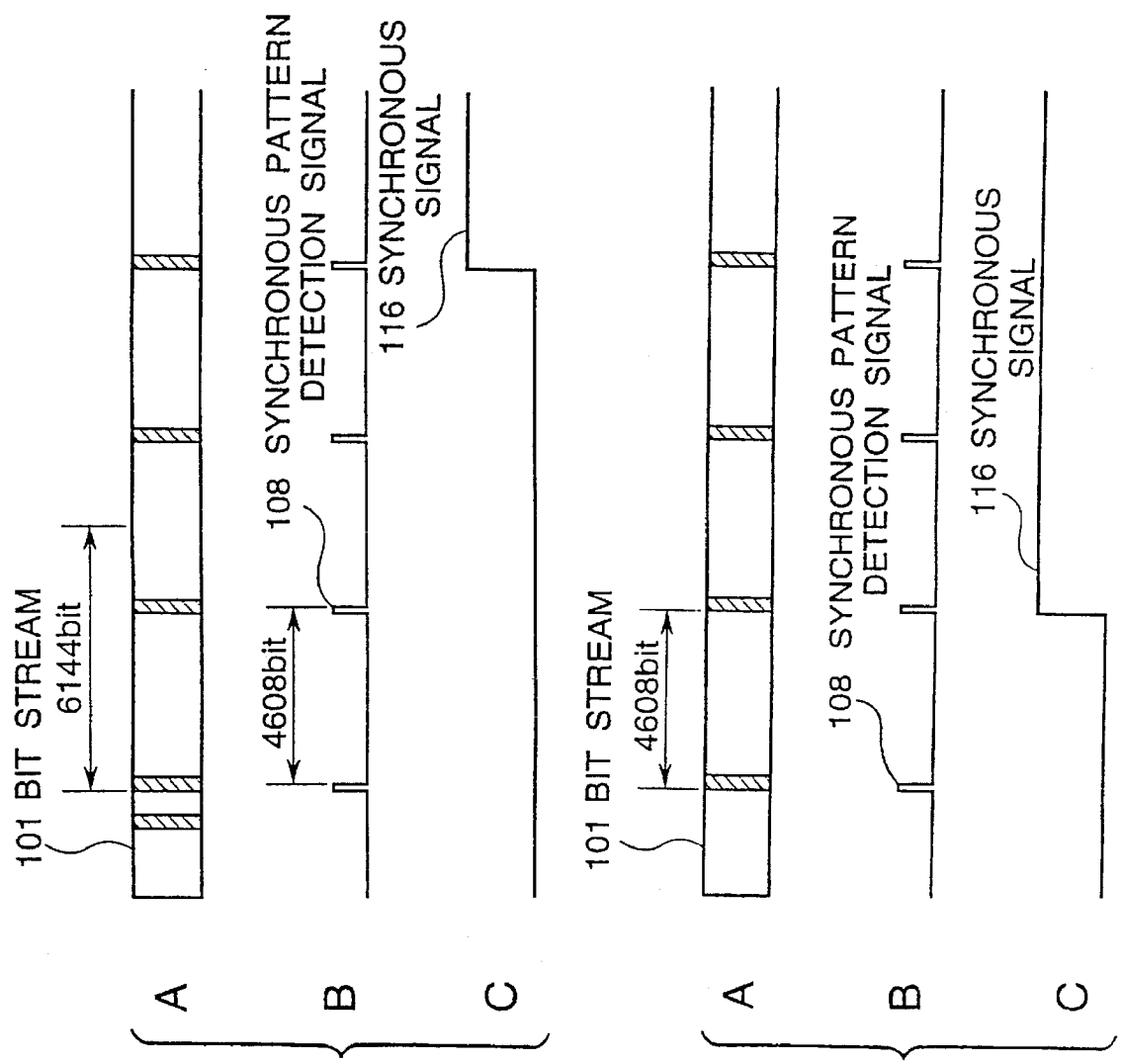
FIG. 4 is a timing chart illustrating the timing for establishing frame synchronism, when a counting operation starts from a normal synchronous pattern.
FIG. 5 is a timing chart illustrating the timing for establishing frame synchronism, when a counting operation starts from a quasi synchronous pattern.
Figure 7:
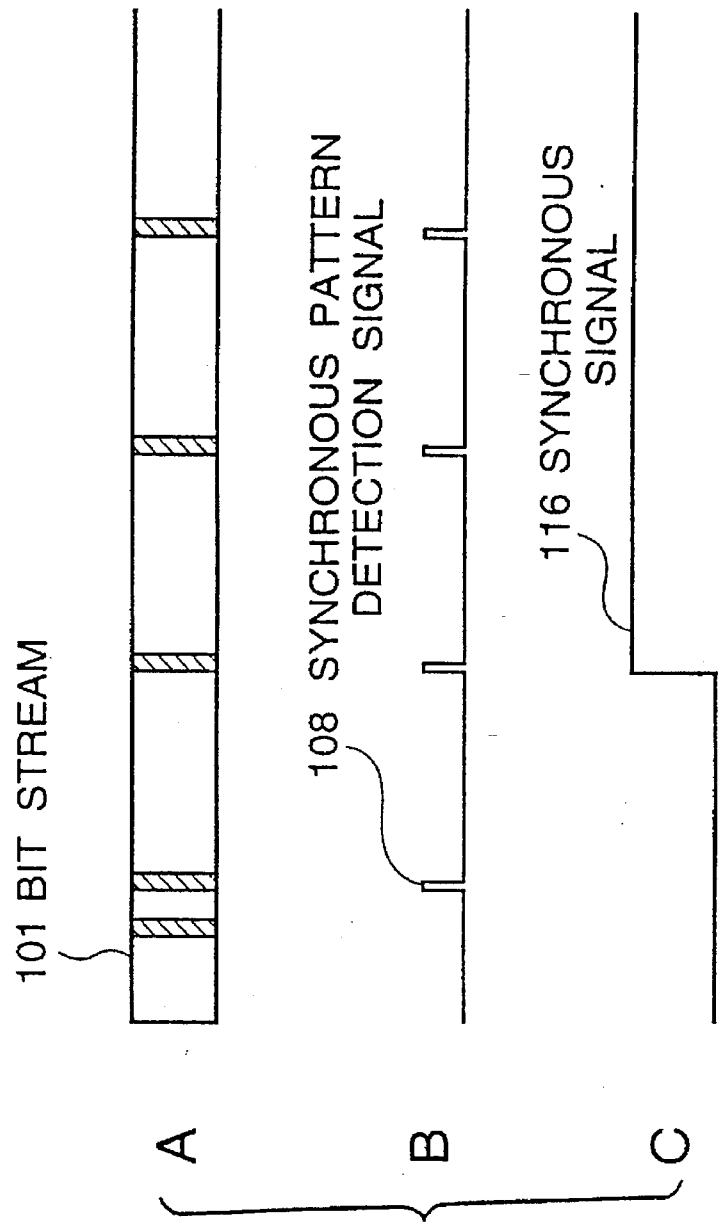
FIG. 7 is a timing chart illustrating the timing for establishing frame synchronism in the embodiment of the present invention, when a counting operation starts from a quasi synchronous pattern.

Referring to FIG. 7, there is shown a timing chart illustrating the operation when the bit stream 101 is applied, similar to that case shown in FIGS. 5A, 5B and 5C. "A" in FIG. 7 indicates the bit stream 101, and "B" in FIG. 7 shows the synchronous pattern detection signal 108. "C" in FIG. 7 indicates the synchronous signal 116. The hatched portion in "A" in FIG. 7 designates the synchronous pattern.

In this example, such a condition is set in the synchronous pattern register 1 as to treat the received bit train as the synchronous pattern, only when the frame included in the bit stream 101 is the layer 2, the sampling frequency is 48 KHz, and the bit rate is 192 kb/s. In this condition, the set values are so that the layer="10", the bit rate index="1010" and the sampling frequency="01".

A first inputted quasi synchronous pattern is "1100" indicating that the bit rate index is 256 kb/s. Since the first inputted quasi synchronous pattern of "1100" is different from the above set value "1010", the synchronous pattern detector 4 does not output the synchronous pattern detection signal 108. Next, when a first correct synchronous pattern is inputted, the synchronous pattern is completely consistent with all the items set in the synchronous pattern register 1, the synchronous pattern detector 4 outputs the synchronous pattern detection signal 108, so that the frame counter 6 starts its Counting operation, with the result that when a second normal synchronous pattern is inputted, the synchronous signal 116 is outputted from the consistency detector 9.

In the above mentioned example, the bit rate index includes 15 kinds, the layer includes 3 kinds, and the sampling frequency includes 3 kinds. Therefore, by setting the synchronous pattern corresponding to the respective items (the actual bit rate index, the actual layer and the actual sampling frequency) to the synchronous pattern register 1, probability that the frame counter 6 erroneously starts its counting operation because of a quasi synchronous pattern under the same synchronous pattern detecting condition, is reduced as follows in comparison with the prior art example.

$$(1/15) \times (1/3) \times (1/3) = 1/135$$

In addition, in the case that the bit stream 101 includes a quasi synchronous pattern having the same bit rate index, the same layer and the same sampling frequency as those of the correct synchronous pattern, the bits included in the bit stream 101 are disposed, but the number of bits disposed is ceaselessly the same as the frame length set in the synchronous pattern register 1. Bits of the number corresponding to two or more frames ate never disposed at one time, contrary to from the prior art.

As seen from the above, the present invention is applied to a synchronizing circuit for a bit stream in a compressing/expanding system for a digital audio signal, and is characterized by comprising the means for previously setting the values corresponding to the respective items of the layer, the bit rate and the sampling frequency, and a synchronous pattern detecting means configured not to recognize as a synchronous pattern, a synchronous pattern having values other than the previously set values. With this arrangement, it is possible to remarkably reduce probability that the quasi synchronous pattern is detected as the synchronous pattern, and therefore, it is possible to minimize the missing of sound corresponding to the digital audio signal.

The invention has thus been shown and described with reference to the specific embodiments. However, it should be noted that the present invention is in no way limited to the details of the illustrated structures but changes and modifications may be made within the scope of the appended claims.

I claim:

1. A synchronizing circuit configured to receive a bit stream including header information having a synchronous pattern and frame length determining information in each frame, and to detect a frame boundary so as to generate a frame synchronous signal corresponding to the header information, the synchronizing circuit comprising:

a synchronous pattern holding means for holding an expected pattern value corresponding to at least a portion of said frame length determining a data converting means for converting said bit stream of said synchronous pattern and said frame length determining information into parallel data;

a synchronous pattern detecting means for detecting said synchronous pattern and said frame length determining information from said parallel data, and generating a synchronous pattern detection signal when said synchronous pattern and said frame length determining information from said parallel data are consistent with a predetermined pattern and when a portion of said frame length determining information from said parallel data is consistent with said expected pattern value; and a synchronous pattern discriminating means receiving said synchronous pattern detection signal, for generating a predetermined synchronous signal.

2. A synchronizing circuit claimed in claim 1 wherein said synchronous pattern holding means includes a synchronous pattern register for holding said expected pattern value, and wherein said synchronous pattern detecting means includes:

a header register responding to said synchronous pattern detection signal to extract and hold said frame length determining information from said parallel data;

a frame counter responding to said synchronous pattern detection signal to count the number of bits included in said bit stream supplied after said synchronous pattern detection signal;

a frame length generator for outputting the bit number of one frame from said frame length determining information held in said header register;

a comparator comparing a count value of said frame counter with said bit number of one frame outputted from said frame length generator, and for generating a count end signal when both are consistent with each other; and a consistency detector for generating said predetermined synchronous signal when said synchronous pattern detection signal and said count end signal are concurrently generated.

\* \* \* \* \*

UNITED STATES PATENT AND TRADEMARK OFFICE
CERTIFICATE OF CORRECTION

PATENT NO.   : 5,668,840
DATED        : September 16, 1997
INVENTOR(S)  : Hideto TAKANO It is certified that error appears in the above-indentified patent and that said Letters Patent is hereby corrected as shown below:

Claim 1, column 8, line 59, insert --information;-- after "determining" and begin a new paragraph with "a data".

Signed and Sealed this

Twenty-third Day of December, 1997

Attest:

BRUCE LEHMAN

*Attesting Officer*  *Commissioner of Patents and Trademarks*